UNITED STATES PATENT OFFICE.

ANTOINE HENRI IMBERT, OF GRAND-MONTROUGE, FRANCE, ASSIGNOR TO IMBERT PROCESS COMPANY, OF NEW YORK, N. Y., A CORPORATION OF NEW YORK.

PROCESS OF REDUCING ZINC ORES.

No. 927,857.

Specification of Letters Patent.

Patented July 13, 1909.

Application filed September 8, 1908. Serial No. 451,982.

*To all whom it may concern:*

Be it known that I, ANTOINE HENRI IMBERT, residing at 75 Avenue de la République, Grand-Montrouge, Department of the Seine, France, a citizen of the French Republic, have invented a new and useful Process of Reducing Zinc Ores, of which the following is a specification.

In the reduction of blende and analogous ores, and also in the reduction of certain oxid ores, I have explained in several prior patents (for example Nos. 875,578; 875,579 and 875,580, dated December 31, 1907 and 894,383, dated July 28, 1908) how a so-called "dissolvent" for the ore might be used to render practicable the direct substitution, or, as it is often referred to, the precipitation method of extracting the metal, as distinguished from the old roasting or carbon process. Up to the time of my discoveries in these respects, it had not been practicable to employ the direct substitution method of reduction save with a relatively precious reacting metal, such as copper, although it had long been attempted to devise some means whereby it might be possible to employ a baser metal, such as iron.

Chief among the problems presented in devising a dissolvent whereby the use of iron as a reacting metal might be made practicable, was the difficulty of obtaining a combination which, together with the ore, could be fused at a relatively low temperature, and would leave a liquid residuum that could be drawn off from the retort after the reaction had been effected, and from which the dissolvent ingredients and metallic iron might subsequently be regenerated and used over and over again in the process. How this difficulty was overcome is particularly explained in my prior patents. I found, for instance, that if I employed the combination of an earthy base and a metallic oxid as a dissolvent, and used iron as a reactive metal, the dissolvent and ore would fuse at 1000° to 1100° C. and the residuum was sufficiently liquid to be drawn off from the retort. I also found that if I employed a mixture of peroxid of iron and sulfid of iron, the fusing point of the dissolvent and ore remained substantially the same and the residuum was still liquid and might be drawn off and used over again and again. I also found, as set forth in one of my prior patents, that an oxid ore, such as calamin, might be reduced by the direct substitution process, in accordance with substantially the same method which I have found could be applied to the reduction of blende. I have now discovered, and this discovery constitutes the present invention, that peroxid of iron ($Fe_2O_3$) may, under certain conditions, be employed in and by itself as a dissolvent. In the patents to which I have reference I have described how, in the one case, peroxid of iron might be used with a basic oxid such as lime to form the dissolvent, and, in another case, how it might be used with a metallic sulfid such as ferric sulfid, to form the dissolvent. If the peroxid of iron, however, is mixed with the ore in the proportion of one equivalent of peroxid to two equivalents of blende, and the reacting iron is added to the pre-molten ore in a sufficient quantity to balance atomically the zinc of the ore, then the direct substitution process is rendered practicable with the use of peroxid of iron alone as the dissolvent.

In carrying out the operation, the ore is liquefied in a suitable furnace, with the peroxid of iron. The molten reacting metal is furnished from another furnace and is preferably in a stage suitable for making castings when added to the mixture of blende and peroxid. Both baths, or only one if need be, may be sufficiently superheated to store therein enough heat for the reaction; or, if not superheated, additional heat-units may be supplied during the period of the reaction; that is, enough heat in any case to insure a molten condition of the residuum after the reaction, which latter seems to be endothermic. The two baths having been brought together in a hermetically closed chamber, protected from the air, are commingled either by stirring or discharging the liquid of the baths in thin layers which intersect each other and are made to progress together through a trench. The zinc is released as a vapor and is lead off into a suitable condensation chamber while the liquid residuum, after the reaction, is tapped from the reaction chamber through a suitable hole. Subsequently the dissolvent and reacting metal are regenerated from the residuum in any suitable manner.

In applying the present method to the reduction of oxid ores, it is found that if two equivalents of zinc oxid and one equivalent of peroxid of iron are added together, a mixture is produced which is difficult to fuse. It has been discovered however in the treatment of complex zinc ores, that is ores which are both sulfureted and oxidized, that by adding peroxid of iron to such ores in the proportion of one equivalent thereof for two equivalents of the blende contained in the ores, such ores are readily reducible. Accordingly in reducing oxid ores, a mixture of the type $Fe_2O_3 + 2ZnS$ is employed to assist in liquefying the mixture $Fe_2O_3 + 2ZnO$ or any other mixture of peroxid of iron and an oxidized zinc compound. In other words, to treat oxidized zinc compounds in accordance with the improved process one equivalent of peroxid of iron is added to two equivalents of the oxidized zinc compound and the difficulties in liquefying this mixture are overcome by adding a quantity of the mixture formed by one equivalent of peroxid of iron plus two equivalents of blende.

It will be understood that the details of the process, such as the pre-fusion of the ore, the melting of the reacting metal, the mixture of the two baths, the precipitation or driving off of the metal being reduced, and of the apparatuses and devices employed therein are immaterial to the present invention. It will also be understood that fluxes may be added to the ore in order to liquefy the gangue; and peroxid of iron, moreover, may constitute one of such fluxes.

The invention presents many advantages among which are the absence of any releasing of the metal of the ore during prefusion which in the case of zinc would be objectionable, the regeneration of the dissolvent and of the reacting metal from the residuum, the simplicity of the apparatus required, and the application of the method to simple or complex sulfureted or oxidized ores.

Having now particularly described and ascertained the nature of my said invention and in what manner the same is to be performed, I declare that what I claim is:

1. The herein described process of reducing sulfid ore consisting in melting a mixture of the ore and peroxid of iron, and treating the molten mixture with a reactive metal.

2. The herein described process of reducing blende consisting in melting a mixture of the ore and peroxid of iron, and treating the molten mixture with a reactive metal.

3. The herein described process of reducing sulfid ore consisting in melting a mixture of the ore and peroxid of iron, and treating the molten mixture with molten iron.

4. The herein described process of reducing sulfid ore consisting in melting a mixture of the ore and peroxid of iron in the proportions of one part of peroxid to two parts of ore, and treating the molten mixture with a metallic reagent.

5. The herein described process of reducing blende consisting in melting a mixture of the ore and peroxid of iron in the proportions of one part of peroxid to two parts of ore, and treating the molten mixture with a metallic reagent.

6. The herein described process of reducing sulfid ore consisting in melting a mixture of the ore and peroxid of iron in the proportions of one part of peroxid to two parts of ore, and treating the molten mixture with molten iron.

7. The herein described process of reducing blende consisting in melting a mixture of the ore and peroxid of iron in the proportions of one part of peroxid to two parts of ore, and treating the molten mixture with molten iron.

8. The herein described improvement in the process of reducing an oxidized zinc ore, consisting in the application of a mixture of blende and peroxid of iron, in the proportions of two parts of blende to one part of peroxid, to a mixture of oxid ore and peroxid of iron, in the proportions of two parts of oxid to one part of peroxid, and then treating the resulting mixture while it is in a molten condition with a metallic reagent.

9. The herein described process of treating zinc ore containing both oxids and sulfids, consisting in melting a mixture of the ore and peroxid of iron and then adding to said mixture a metallic reagent.

In testimony whereof I affix my signature in presence of two witnesses.

ANTOINE HENRI IMBERT.

Witnesses:
H. C. COXE,
GORDON I. STEWART.